R. H. MOSES.
Artificial Flower and Pot.

No. 226,922. Patented April 27, 1880.

Witnesses:
H. N. Low
J. S. Barker

Inventor:
Robert H. Moses
by H. H. Doubleday
atty

UNITED STATES PATENT OFFICE.

ROBERT H. MOSES, OF NEW YORK, N. Y.

ARTIFICIAL FLOWER AND POT.

SPECIFICATION forming part of Letters Patent No. 226,922, dated April 27, 1880.

Application filed January 22, 1880.

*To all whom it may concern:*

Be it known that I, ROBERT H. MOSES, of New York, in the county of New York and State of New York, have invented certain new and useful Improvements in Artificial Flowers and Pots; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to produce a new article of manufacture representing a flower-pot filled with earth and having growing therein a flower or shrub, the construction being such that the flower can be inclosed within the pot to guard against injury during transportation.

Figure 1:
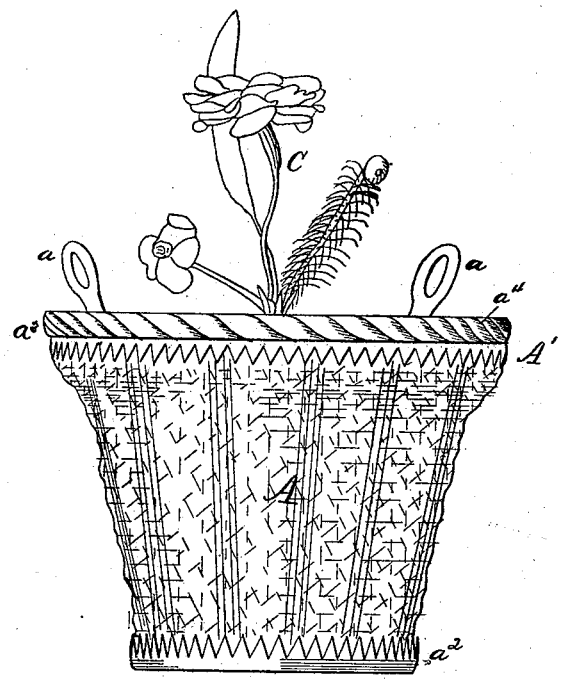
Figure 2:
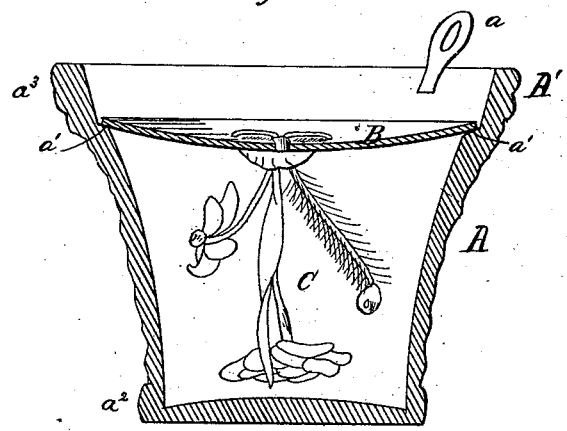

Figure 1 is an elevation of my toy with the flower in an upright position. Fig. 2 is a vertical section with the flower inverted and inclosed within the pot.

A represents the pot, made, by preference, somewhat flaring, with an expanded flange, A', at the top, and provided with an internal shoulder or ledge, $a'$, near its upper end. This ledge or shoulder may be formed, as shown, by an expansion of the flanged portion A', or it may constitute a rib, projecting inwardly.

The exterior is, by preference, ornamented with a bead, $a^2$, at the bottom, a second bead, $a^3$, near the top, and a gilt band, $a^4$, at its upper edge, or any other approved style of ornamentation may be adopted, and the form of the bead may be varied as the taste of the manufacturer or the demands of his trade may indicate.

By preference, I make the pot A of crystallized sugar; or some other material may be adopted.

$a\ a$ are ears or loops projecting from the upper edge of the pot to suspend it by.

B is a cover, circular in form, and of such size as to fit closely and rest upon the shoulder $a'$. By preference it is made convex upon its upper face, and is painted brown or otherwise made to represent earth. I usually coat it with burnt sugar or caramel for that purpose.

C represents an artificial flower or shrub, the stem of which is secured at its lower end on the cover B. In this instance I have shown it secured by being passed through a small hole in the cover and fastened upon the under side with a wire, using for this purpose the wire stem of one of the artificial flowers; but when preferred a socket can be formed in the cover and the stem or stems of the flower or shrub inserted therein. In practice I prefer the method shown, because the stems of the shrub or flower project through the cover and constitute the handle by which the flowers and cover can be placed in the inverted position within the pot, as shown in Fig. 2.

It will be readily understood that by thus inverting the position of the flowers they are protected from injury during transportation, and space in packing is also thereby economized.

It will also be seen that by making the cover convex the projecting end of the stems which form the handle are within the horizontal plane of the edge of the cover when inverted, so that if the pot were made without the flange A' the end of the stem would still be below the upper edge of the pot and cover, and therefore not liable to be disturbed in packing or handling.

What I claim is—

1. The herein-described article of manufacture, consisting of the pot A', the reversible cover B, and the artificial flower or shrub C, substantially as set forth.

2. In combination with the pot and the reversible cover B, the artificial flower or shrub C, having the ends of its stem projecting through the cover, whereby it is adapted to serve as a handle, substantially as set forth.

In testimony that I claim the foregoing I have hereunto set my hand this 21st day of January, 1880.

ROBERT H. MOSES.

Witnesses:
 GEORGE A. MILNE,
 JOHN H. UNDERHILL.